United States Patent
Pollack et al.

(10) Patent No.: US 7,416,366 B2
(45) Date of Patent: Aug. 26, 2008

(54) SUBSEA PIPELINE SYSTEM

(75) Inventors: Jack Pollack, Houston, TX (US); Hein Wille, Eze Village (FR); Leendert Poldervaart, La Turbie (FR)

(73) Assignee: Single Buoy Moorings Inc., Marly (CH)

( * ) Notice: Subject to any disclaimer, the term of this patent is extended or adjusted under 35 U.S.C. 154(b) by 3 days.

(21) Appl. No.: 10/543,738

(22) PCT Filed: Jan. 29, 2004

(86) PCT No.: PCT/NL2004/000068
§ 371 (c)(1),
(2), (4) Date: Jul. 29, 2005

(87) PCT Pub. No.: WO2004/068014
PCT Pub. Date: Aug. 12, 2004

(65) Prior Publication Data
US 2006/0153639 A1 Jul. 13, 2006

(30) Foreign Application Priority Data
Jan. 30, 2003 (EP) .................................. 03075295

(51) Int. Cl.
*F16L 1/12* (2006.01)
(52) U.S. Cl. ..................................................... 405/169
(58) Field of Classification Search ............. 405/168.1, 405/169–172, 158; 114/243
See application file for complete search history.

(56) References Cited

U.S. PATENT DOCUMENTS

| 4,110,994 A | | 9/1978 | Lundh |
| 4,263,004 A | | 4/1981 | Joubert et al. |
| 4,909,670 A | * | 3/1990 | Harrison ................. 405/168.2 |
| 5,275,510 A | | 1/1994 | de Baan et al. |

FOREIGN PATENT DOCUMENTS

WO  WO 99/62762 A1  12/1999

* cited by examiner

*Primary Examiner*—Sunil Singh
(74) *Attorney, Agent, or Firm*—The Webb Law Firm

(57) ABSTRACT

The invention relates to a subsea pipeline system for connecting two hydrocarbon production, storage and/or processing structures. The subsea pipeline has a first duct section supported on the seabed, a bridging duct section extending across a lower seabed part, at a distance from the sea bed, and a second duct section supported on the sea bed. The first and second duct sections are connected to the bridging duct section via an articulation joint allowing movement of the bridging duct section in a length direction of the first and second duct sections. A first tensioning element exerts an upward force on the bridge duct sections and a second tensioning element exerts a downward force on the bridge duct section. The first and second tensioning elements include a mutual angle to exert a horizontal pulling force on the bridging duct section.

12 Claims, 3 Drawing Sheets

SUBSEA PIPELINE SYSTEM

BACKGROUND OF THE INVENTION (1) Field of the Invention

The invention relates to a subsea pipeline system for connecting two hydrocarbon production, storage and/or processing structures.

(2) Description of the Related Art

From WO 99/62762, in the name of the applicant, a submerged transfer pipe system is known for transfer of hydrocarbons between two floating offshore structures at sea level. The known transfer pipe system comprises a horizontal duct section, which may have a length of 1000 m or more, suspended from inclined vertical duct sections on each of the respective offshore structures (SPAR buoy, FPSO, export buoy, etc.). A tensioning weight, or tensioning cable connected to the sea bed, is connected near the flexible joints connecting the vertical an horizontal duct sections, such that a tensioning force is exerted on the horizontal duct which prevents buckling or bending and which reduces horizontal displacements due to currents acting on the horizontal duct section.

The known pipeline structure is particularly suitable for use in mid-depth waters such as depths of 50-500 m.

It is an object of the present invention to provide a transfer pipe system which is suitable for use on an irregular seabed.

SUMMARY OF THE INVENTION

Hereto the transfer pipe system according to the present invention comprises a first duct section supported on the sea bed, a bridging duct section extending across a lower seabed part, at a distance from the sea bed, and a second duct section supported on the sea bed, the first and second duct sections being connected to the bridging duct section via an articulation joint allowing movement of the bridging duct section in a length direction of the first and second duct sections, wherein a first tensioning element is with a first end connected to the bridging duct section at or near the articulation joint and with a second end to a lifting structure which is located at a relatively short distance above the bridging duct section, for exerting an upward force thereon, and a second tensioning element connected with one end to the bridging duct section and with the other end to a downward pulling structure, which is located below the bridging duct section, the first and second tensioning elements including a mutual angle such as to exert a horizontal pulling force on the bridging duct section.

By placing the duct sections on the seabed, they are maintained in a stable position without being subject to displacements by currents. At the location of lower regions of the seabed, such as subsea canyons, the bridging duct section is subject to horizontal drift displacement and to vertical displacements. By providing the lifting structure near the end parts of the first and second duct sections, and the downward pulling structure, the ends of the bridging duct section can be firmly kept in position near the higher sea bed part. The lifting structure does not extend more than half the water depth above the seabed. As the articulation joint allows movement of the bridging duct section in its length direction, sufficient possibilities for movement of the bridging duct section are provided with respect to the fixed end parts of the first and second duct sections, such that buckling an bending of the bridging duct section is prevented.

The articulated joints furthermore allows easy positioning and installation of the bridging duct section as well as removal or temporary disconnection of the bridging duct section for replacement and for maintenance.

The first and second production, storage and/or processing structures may be on shore or offshore structures, located on or below the sea surface, such as SPAR buoys, FPSO's onshore power plants, LNG tankers, regasification plants, processing equipment, etc.

An embodiment of a subsea pipeline structure according to the present invention comprises a lifting structure that is supported on the seabed and which extends above the bridging duct section, the first tensioning element comprising a line connected to the lifting structure and to the bridging duct section, the line making an angle with the vertical direction. The lifting structure may be a frame-construction or tower, preferably with a height between 5 and 50 m. The tower provides a secure fixing of the end parts of the first and second duct sections on the sea bed without being affected by subsea currents.

In another embodiment, the lifting structure comprises a buoyancy device exerting an upward force on the ends of the bridging duct section.

The articulation joints allowing movement of the bridging duct section in the length direction of the first and second duct sections, as well as transversely to the duct sections in a horizontal and vertical direction, may comprise a flexible jumper hose or a hard pipe section with a pipe swivel, a flexible joint, a bellow or a ball joint on each end of the pipe section.

BRIEF DESCRIPTION OF THE DRAWINGS

Some embodiments of a subsea pipeline system according to the present invention will be described in detail with reference to the accompanying drawings, by way of non-limiting example. In the drawings.

DETAILED DESCRIPTION OF THE INVENTION

Figure 1:
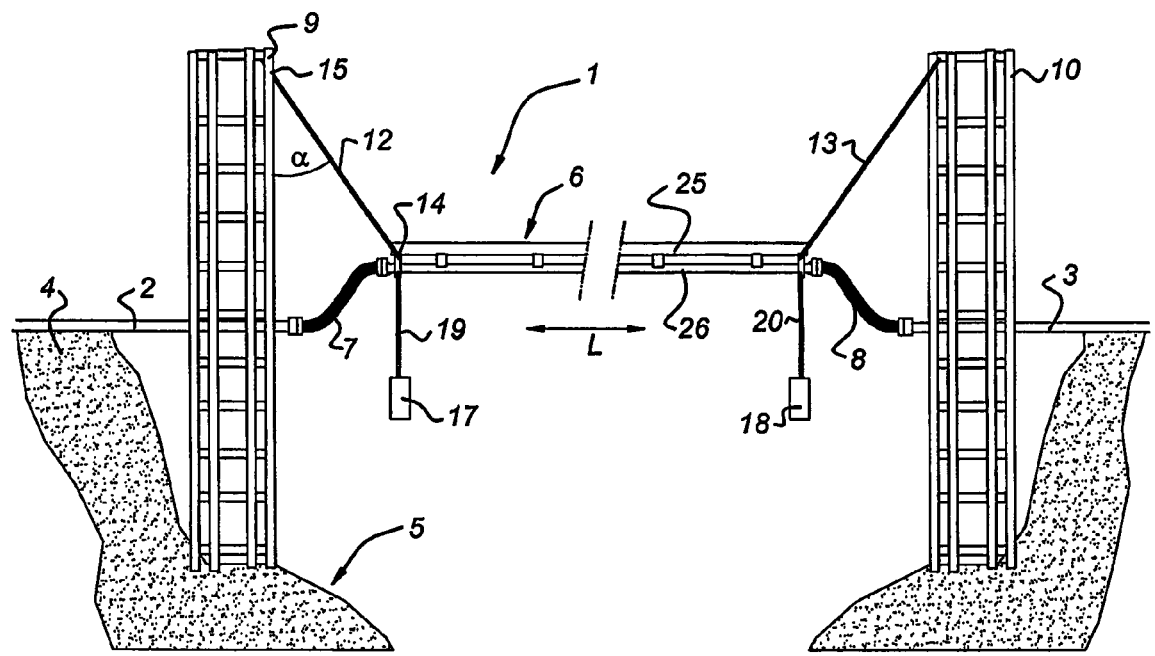
FIGS. 1 and 2 show a schematic view of an embodiment of a seabed-supported pipeline system according to the present invention, the bridging duct section being supported by a tower.

FIG. 1 shows a submerged pipeline system 1 comprising two substantially horizontal first and second duct sections 2, 3 supported on a substantially horizontal part of the seabed 4. Near a lower seabed part 5, which may for instance comprise a subsea canyon, the duct sections 2, 3 are connected to a bridging duct section 6 via articulation joints 7, 8. Near the edges of the lower seabed part 5, the bridging duct section 6 is supported by a tower or frame construction 9, 10, which is anchored in the seabed. A tensioning element 12, 13, such as a steel or polyester cable or chain, is with a first end 14 connected to the bridging duct section 6 and with a second end 15 to an upper part of the tower. The cable 12 extends at an angle α with respect to the vertical. A second tensioning element, which is in this case formed by a weight 17, 18, is suspended from a cable 19, 20. The articulation joints 7, 8 are formed by flexible duct sections or flexible jumper hoses which can bend and flex to allow displacement of the bridging duct section 6 in the length direction L as well as in a vertical direction in the plane of the drawing or in a horizontal direction perpendicular to the plane of the drawing due to drift caused by subsea currents. Movement of the bridging duct section 6 is isolated from the stationary and rigidly supported pipe sections 2, 3 and bending moments and stresses are not transferred to the horizontal duct sections 2, 3. The weights 17, 18 in combination with the inclined cables 12, 13 result in a horizontal tensioning force on the bridging duct section 6, which is stabilised in this way and by which bending and buckling of the duct section 6 is prevented. The horizontal duct section 6 may have a length of between 50 and 1000 m. The length of flexible duct 7, 8 may be between 5 and 50 m. The height of towers 9, 10 may be between 5 and 50 m. The bridging duct section may comprise a supporting frame 25 along which a bridging duct 26 is supported. The frame 25 may comprise buoyancy members, such as to provide neutral buoyancy to bridging duct section 6.

The horizontal duct sections 2, 3 may connect to subsea hydrocarbon structures, such as wellheads, distribution manifolds, or may be connected to offshore constructions at sea level, such as LNG-tankers, FPSO, SPAR-buoys, and the like. The ducts may also connect to onshore hydrocarbon processing and/or storage structures, such as gas fuelled or oil fuelled power plants, on shore gas or oil storage tanks, processing plants and the like. One of the duct sections 2, 3 may be connected to an onshore hydrocarbon storage and/or processing structure whereas the other one is connected to an offshore construction.

Figure 2:
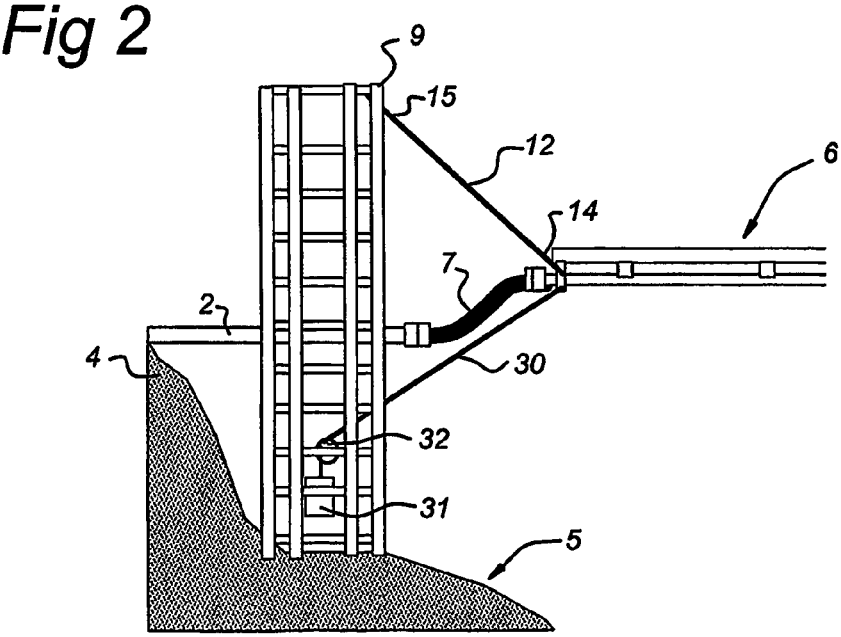

FIG. 2 shows a construction in which the lower tensioning element is comprised of a cable 30 connected to a counter weight 31 via a sheeve 32. In this way chances of interference of the weight 31 with pipeline 2, 3 or with bridging duct section 6 are minimised.

Figure 3:
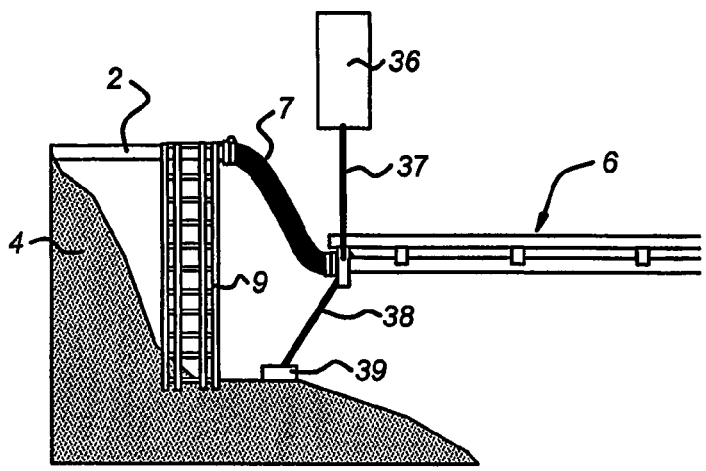
FIGS. 3-5 show a schematic view of an embodiment of a seabed-supported pipeline system, the bridging duct section being supported by a buoyancy element.

In the embodiment of FIG. 3, a relatively short supporting frame 9 is used. The first tensioning element comprises a buoyancy device 36, attached to bridging duct section 6 via cable 37. The bridging duct section 6 is with one end connected to a downward pulling cable 38, which is fixed in a connection point 39 to the seabed 4.

Figure 4:
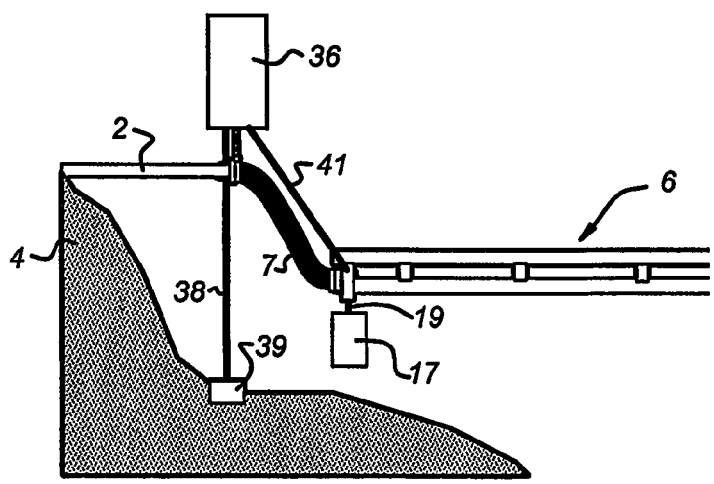

In the embodiment of FIG. 4, a buoyancy device 36 is connected via an articulated joint to the end part of duct section 2 and is anchored with a cable 38 and anchoring element 39 to the seabed 4. Via a second cable 41 extending at an angle to the vertical, buoyancy device 36 is connected to the end part of bridging duct section 6, which carries at its end a weight 17. In this construction, a single buoyancy device 36 supports both the end part of horizontal duct section 2 and the bridging duct section 6.

Figure 5:
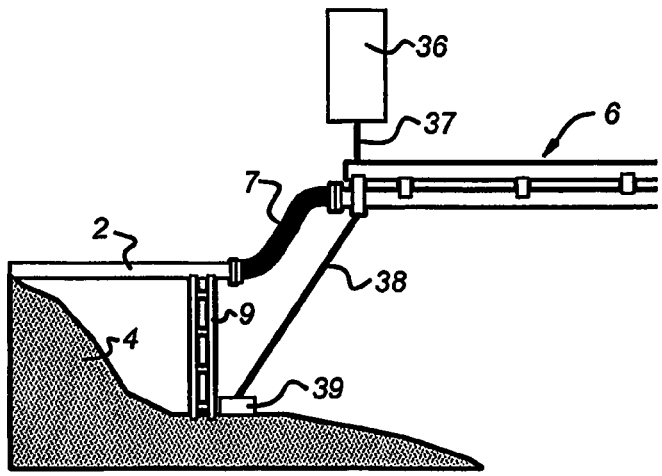

In the embodiment as shown in FIG. 5, a relatively long downward pulling cable 38 is employed compared to the embodiment of FIG. 3, such that the degree of movement of bridging duct section 6 is relatively large. By use of such a longer cable 38, the axial forces acting on the fluid transfer duct 6 and can be adjusted to the environmental conditions by change in length. Hereby, the stiffness of the system can be adjusted and optimised even after installation, or may be re-adjusted after a certain amount of time.

Figure 6:
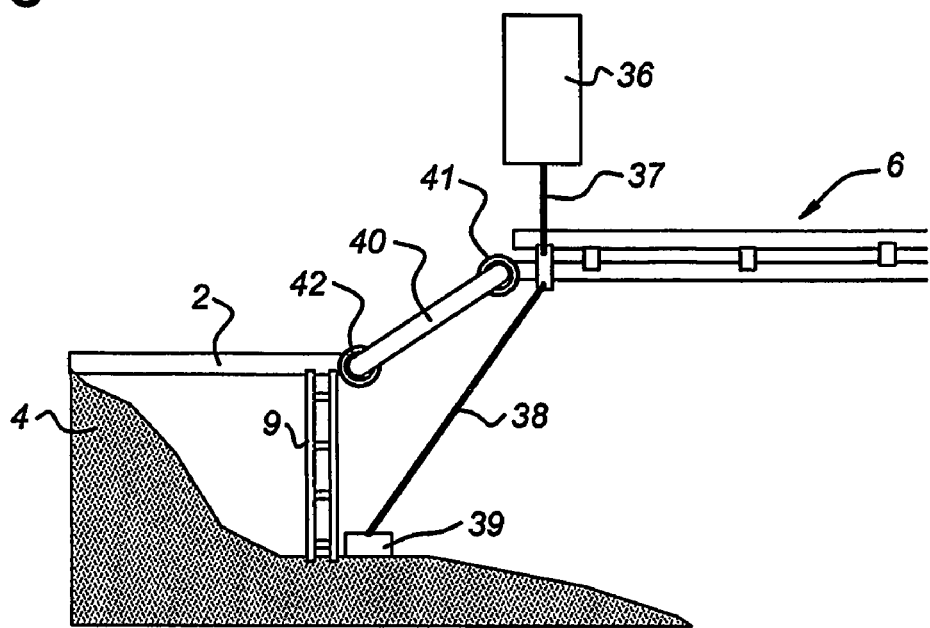
FIGS. 6 and 7 show embodiments of an articulation joint comprising hard piping and swivel elements.

In the embodiment shown in FIG. 6, the articulation joint is comprised of a rigid pipe section 40, comprising at its end part a pipe swivel or ball joint 41, 42, which allows for movements perpendicular out of the plane of the drawing. In this construction, movement out of the plane of the drawing is restricted. By the use of rigid pipe sections, the pressures in relatively deep waters can be taken up.

Figure 7:
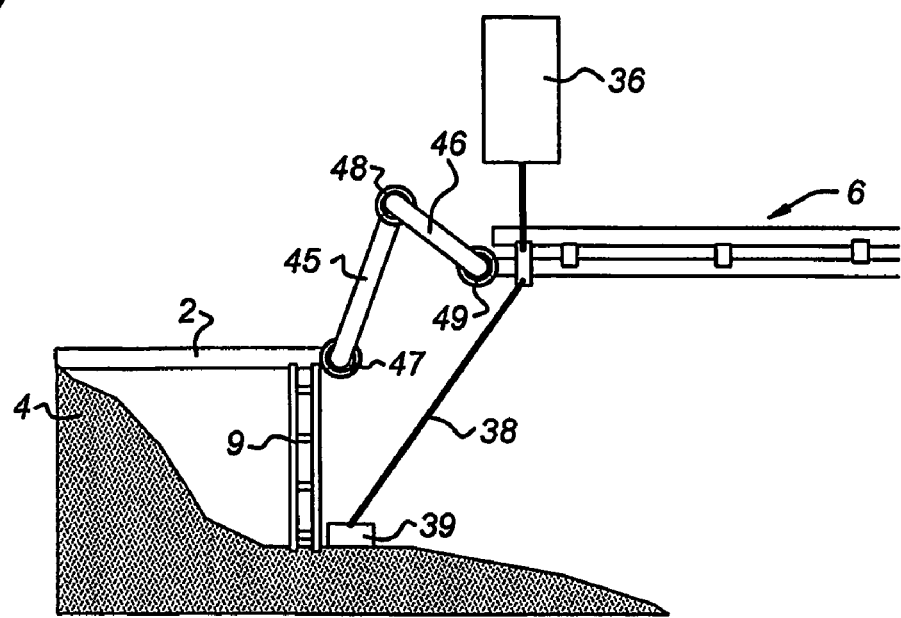

In the embodiment shown in FIG. 7, the articulation joint comprises two joint part 45, 46 and three pipe swivels 47, 48 and 49. In this construction, horizontal movement of the bridging duct section 6 can be better accommodated compared to the construction shown in FIG. 6.

The invention claimed is:

1. A subsea pipeline system for connecting two structures comprising a first substantially horizontal duct section supported on the sea bed, a substantially horizontal bridging duct section extending across a lower seabed part, at a distance from the sea bed, and a second substantially horizontal duct section supported on the sea bed, the first and second substantially horizontal duct sections being connected to the substantially horizontal bridging duct section via an articulation joint allowing movement of the substantially horizontal bridging duct section in a length direction of the first and second substantially horizontal duct sections, wherein a first tensioning element is with a first end connected to the substantially horizontal bridging duct section at or near the articulation joint and with a second end to a lifting structure which is located at a relatively short distance above the substantially horizontal bridging duct section, for exerting an upward force thereon, and a second tensioning element connected with one end to the substantially horizontal bridging duct section and with the other end to a downward pulling structure, which is located below the substantially horizontal bridging duct section, the first and second tensioning elements including a mutual angle such as to exert a horizontal pulling force on the substantially horizontal bridging duct section.

2. The subsea pipeline system according to claim 1, wherein the lifting structure is supported on the sea bed and extends above the substantially horizontal bridging duct section, the first tensioning element comprising a line connected to the lifting structure and to the substantially horizontal bridging duct section, the line making an angle with the vertical direction.

3. The subsea pipeline system according to claim 1, wherein the lifting structure comprises a buoyancy device, connected with a line to the substantially horizontal bridging duct section.

4. The subsea pipeline system according to claim 1, wherein the second tensioning element comprises a line connected to the substantially horizontal bridging duct section and to a connection point at or near the sea bed, the line making an angle with the vertical.

5. The subsea pipeline system according to claim 1, wherein the downward pulling structure comprises a weight suspended from the substantially horizontal bridging duct section.

6. The subsea pipeline system according to claim 1, wherein the ends of the first and second substantially horizontal duct sections are supported on the sea bed via a respective vertical support structure.

7. The subsea pipeline system according to claim 1, wherein the articulation joint comprises a flexible duct section.

8. The subsea pipeline system according to claim 1, wherein the articulation joint comprises a duct section extending at an angle with the first and second substantially horizontal duct sections, and comprising near its respective ends a swivel.

9. The subsea pipeline system according to claim 1, wherein the substantially horizontal bridging duct section is provided with buoyancy such as to have a substantially neutral buoyancy.

10. The subsea pipeline system according to claim 1, wherein the first and second substantially horizontal duct sections and the substantially horizontal bridging duct section are made of hard pipe.

11. The subsea pipeline system according to claim 1, wherein the substantially horizontal bridging duct section comprises at least two parallel duct sections.

12. The subsea pipeline system according to claim 1, wherein the two structures are hydrocarbon production, storage and/or processing structures.

* * * * *